United States Patent
Cardinal et al.

(10) Patent No.: US 7,994,658 B2
(45) Date of Patent: Aug. 9, 2011

(54) WINDFARM COLLECTOR SYSTEM LOSS OPTIMIZATION

(75) Inventors: Mark E. Cardinal, Altamont, NY (US); Robert W. Delmerico, Clifton Park, NY (US); Nicholas W. Miller, Delmar, NY (US); Reigh A. Walling, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 399 days.

(21) Appl. No.: 12/039,028

(22) Filed: Feb. 28, 2008

(65) Prior Publication Data

US 2009/0218817 A1    Sep. 3, 2009

(51) Int. Cl.
*H02J 3/00* (2006.01)
(52) U.S. Cl. ......................................................... 307/84
(58) Field of Classification Search ...................... 307/84
See application file for complete search history.

(56) References Cited

U.S. PATENT DOCUMENTS 6,924,565 B2    8/2005    Wilkins et al.
7,119,452 B2    10/2006   Larsen

*Primary Examiner* — Rexford Barnie
*Assistant Examiner* — Dru Parries
(74) *Attorney, Agent, or Firm* — Ernest G. Cusick; Frank A. Landgraff

(57) ABSTRACT

A windfarm system is provided that is optimized for minimizing electrical loss. The windfarm system includes a plurality of wind turbine generators and a collector system including a conductor or network of conductors. The collector system also including a plurality of transformers with one or more transformers connected between each wind turbine generator and the conductors, and a substation transformer connecting the windfarm collector system to the electrical grid. The windfarm system also includes a monitoring system for monitoring the windfarm system electrical output and thermal condition, and outputs of the individual wind turbine generators. A control function may include voltage and real and reactive power commands to the individual wind turbine generators. The control function incorporates an algorithm whose technical effect is minimizing electrical losses for the windfarm system.

22 Claims, 7 Drawing Sheets

WINDFARM COLLECTOR SYSTEM LOSS OPTIMIZATION

BACKGROUND OF THE INVENTION

The invention relates generally to controlling power loss in a windfarm and more specifically to a system and method for distributing reactive load and windfarm voltage optimization for reduction of collector system losses.

Wind turbines are anticipated to becoming a progressively larger source of energy throughout the world, based on their capture of a renewable source of energy that does not emit carbon-based gases. However, wind turbine system development is still in the early stages relative to competing technologies. More specifically, system control for groups of jointly controlled wind turbines, or wind farms, is still in its infancy.

Current windfarm control techniques generally relate to voltage control and or real and reactive power control, either at the individual turbine or at a common collecting point for the system. Efficiency of the system, based on loss reduction, has generally not been considered in such control schemes.

The losses of a windfarm collector system are the sum of the ohmic load losses, proportional to the current magnitude squared, and the no-load excitation losses of the transformers in the collector system, which are proportional to the voltage raised to an exponent. This exponent is always greater than two. Empirically, the exponent is typically near three.

The load loss $P_{LL}(S,V)$, sometimes known as conduction loss or "copper" loss at any windfarm complex power output S and voltage V, is related to the load loss $P_{LL\text{-}rated}$ at the rated power output $S_{rated}$ and rated (nominal) voltage $V_{rated}$ by Equation 1.

$$P_{LL}(S, V) = \left(\frac{V_{rated}}{V}\right)^2 \cdot \left(\frac{S}{S_{rated}}\right)^2 \cdot P_{LL\text{-}rated} \qquad \text{Equation (1)}$$

The no-load loss of the collector system transformers $P_{NL}(V)$, also called the excitation loss or "iron" loss, at any voltage V, is related to the no-load loss $P_{NL\text{-}rated}$ at rated voltage $V_{rated}$ by the following:

$$P_{NL}(V) = \left(\frac{V}{V_{rated}}\right)^N \cdot P_{NL\text{-}rated} \qquad \text{Equation (2)}$$

where N is an empirically derived exponent unique to the magnetic design and materials of the transformers used in the collector system.

The total loss $P_{LOSS}(S,V)$ at any voltage and complex power level is the sum of Equation (1) and (2), as described in Equation (3).

$$P_{LOSS}(S, V) = \left(\frac{V_{rated}}{V}\right)^2 \cdot \left(\frac{S}{S_{rated}}\right)^2 \cdot P_{LL\text{-}rated} + \left(\frac{V}{V_{rated}}\right)^N \cdot P_{NL\text{-}rated} \qquad \text{Equation (3)}$$

The total loss can be minimized by optimized selection of V. This can be determined by differentiating Equation (3) with respect to V, and solving for the value of V where this first derivative is zero.

For typical parameters FIG. 1 shows the variation of total loss with voltage level for four different power levels. At 10% power, a low voltage is optimal. At 30% power, a voltage near the rated value is optimal, and above this power level, a high voltage is optimal from the standpoint of losses. The same information is shown in a 3-dimensional format in FIG. 2.

In addition to control solutions it would be possible to design a lower loss collector system by decreasing the collector system resistance (increase conductor cross sectional area) or designing a higher voltage collector system. These alternatives require substantial equipment investment and the savings in reduced losses generally do not justify the equipment investment.

Accordingly, there is a need to provide a method for system control to reduce losses through optimization of reactive load distribution and voltage control, while maintaining essentially the same physical equipment and control structure for the system.

BRIEF DESCRIPTION OF THE INVENTION

The present invention relates to a windfarm system that is optimized for minimizing electrical loss and a method for minimizing electrical loss in the windfarm system.

Briefly in accordance with one aspect of the present invention, a windfarm system is provided that is optimized for minimizing electrical loss. The windfarm system includes a plurality of wind turbine generators and a collector system including a conductor or network of conductors. The collector system also includes a plurality of transformers with one or more transformers connected between each wind turbine generator and the conductors, and a substation transformer connecting the windfarm collector system to the electrical grid. The windfarm system also including a monitoring system for monitoring the windfarm system electrical output and thermal condition, and outputs of the individual wind turbine generators. A control system includes voltage and real and reactive power commands to the individual wind turbine generators. The system incorporates an algorithm whose technical effect is minimizing electrical losses for the windfarm system.

According to another aspect of the present invention, a method is provided for controlling windfarm operation to minimize electrical losses. The method includes connecting a plurality of wind turbine generators to the conductors or network of conductors within a windfarm collector system; connecting the windfarm collector system to the electrical grid through a substation transformer; monitoring electrical output for the windfarm system, monitoring the output of the individual wind turbine generators; and providing voltage and real and reactive power commands to the individual wind turbine generators, according to an algorithm whose technical effect is minimizing electrical losses for the windfarm collector system.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
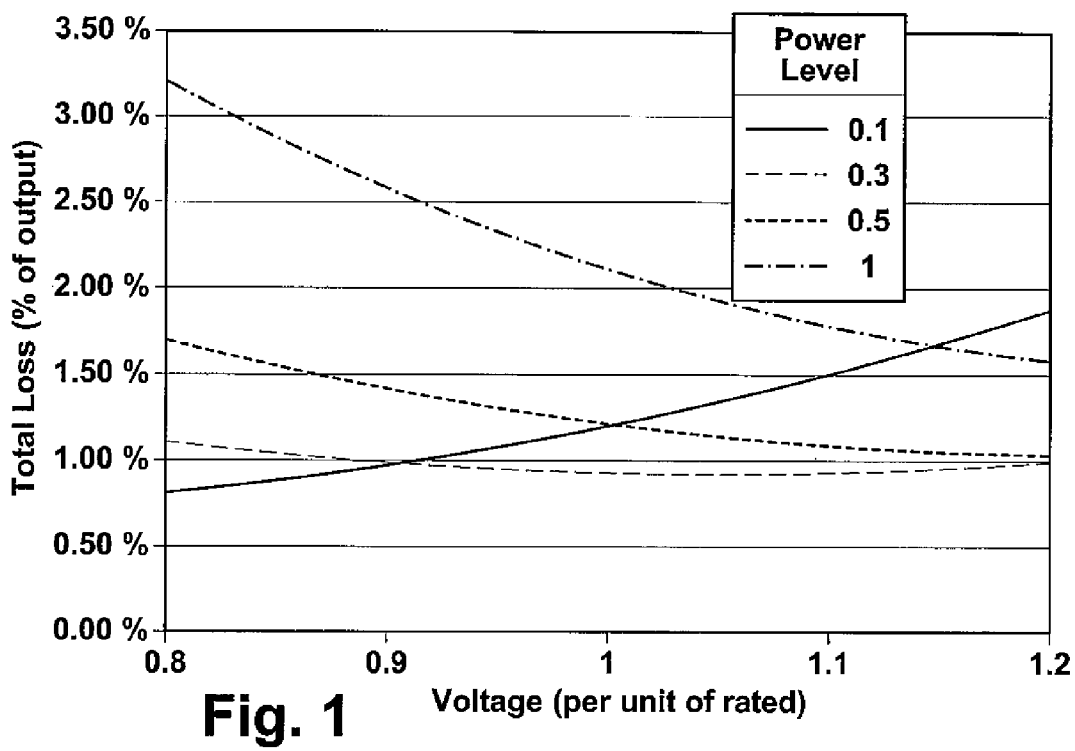
FIG. 1 is a graph illustrating the variation of total power loss with voltage level for varying power levels.
Figure 2:
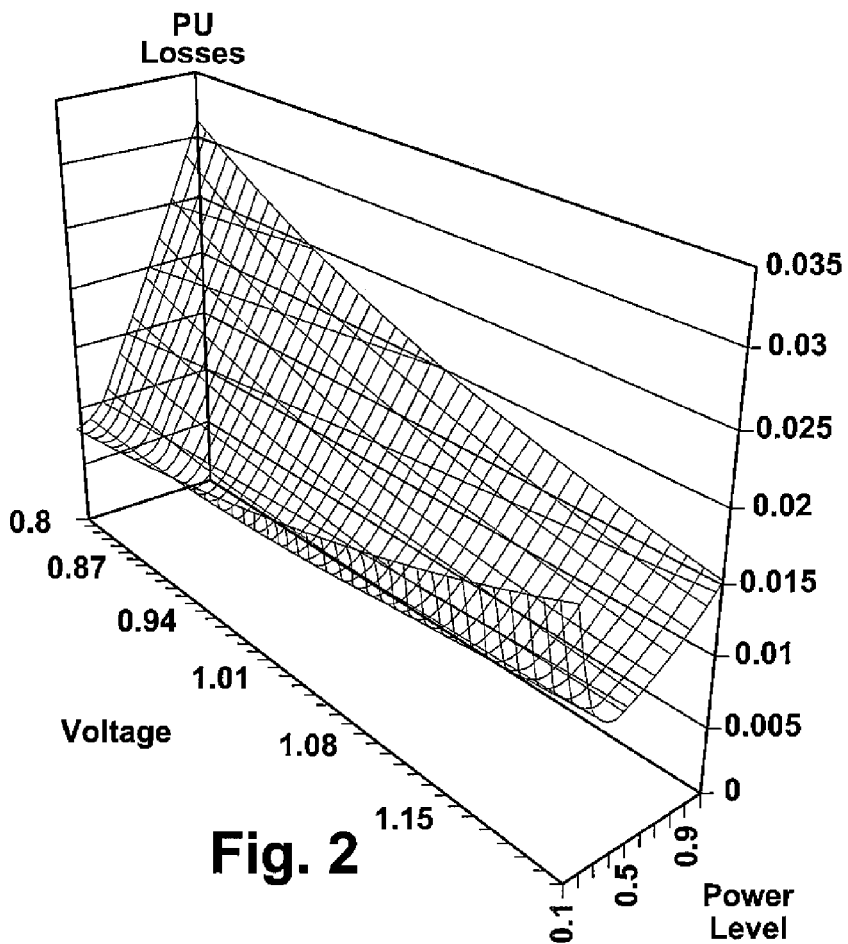
FIG. 2 is a 3-dimensional graph illustrating the variation of total power loss with voltage level for varying power levels.

The following embodiments of the present invention have many advantages, including reducing windfarm power losses through optimization of reactive load distribution and system voltage control without a need for system hardware changes Currents flowing in a windfarm collector system create losses due to the electrical resistance of the system. A windfarm collector system is constructed as a long conductor with wind turbines connected in parallel along its length. The conductor may be in a simple radial configuration, in a dendritic topology with one or more branchings, or in a loop configuration. The wind turbine generators that are further away from the substation or point of common coupling transmit their power over a greater distance and thus exhibit more real and reactive power losses than turbines closer to the point of common coupling. Furthermore, current is inversely proportional to voltage for a constant power. By increasing collector system voltage, less current is required to deliver the same power. Conductor losses in cables and transformers are proportional to the square of the current magnitude. Where it is possible to increase collector system voltage, conductor losses can be decreased. Wind turbines are connected to the collector system via transformers, which have excitation losses that are independent of loading, but which increase with voltage to an exponential power greater than two. Under light load conditions, windfarm electrical losses are dominated by transformer excitation losses. Under high production levels, conductor losses dominate. Thus, optimization of VAR production assignments to individual wind turbine generators, and optimization of collector system voltage, decreases collector system losses. Minimizing these losses yields greater energy production supplied to the electrical grid, and thus increased revenue for the windfarm owner.

In a first approach the objective is to manage the windfarm voltage level such that the total loss is minimized. For the purpose of this explanation, variations in voltage magnitude within the windfarm collector system are not considered, nor is the optimization of wind turbine generator reactive power output. This concept may be incorporated into the present invention through use of an on-load tap changer on the windfarm substation transformer, allowing adjustment of the collector system voltage independent of the grid voltage. A principal constraint is that the voltage at each wind turbine generator must be within the operating limits for that device; e.g., 0.9 to 1.1 times rated voltage. A functionality requirement for such control is that the substation transformer must have sufficient tap range to provide a ratio matching the optimized collector system voltage with the utility grid voltage. The first approach may be applied with a windfarm substation transformer having on-load tap changing ability allowing the collector voltage to be adjusted independent of the grid voltage. In this approach, collector voltage is optimized to balance the tradeoff between cable and transformer load-losses, and transformer core losses. Under light load, the voltage is reduced to minimize core loss, and under heavy load, voltage is increased to reduce current for the same power, thus reducing ohmic conductor losses. This first approach can also be used where on-load tap changing capability is not available, by adjusting collector voltage using wind turbine generator reactive capability where windfarm power factor or voltage regulation is not required. An algorithm is provided whose technical effect is to minimize electrical losses for the windfarm by controlling collector voltage.

In a second approach the invention reduces the power losses in a windfarm collector system by management of the collector system voltage magnitude and distribution of reactive power production. In one embodiment of this approach, the total windfarm VAR production is dispatched with priority to the wind turbines that are closest to the point of common coupling. Other controllable reactive power generating components connected to the collector system may also be used to control the distribution of reactive power. These devices may include insertable capacitor banks, static var compensators, and reactor banks strategically positioned within various sections or branches of the windfarm to influence the distribution of reactive currents and thereby control power losses.

The following inventive techniques may be incorporated into the WindCONTROL (WFMS) wind plant control system by General Electric.

An optimizing algorithm is provided whose technical effect is to determine the VAR dispatching command to each wind turbine generator and substation transformer tap that reduces total losses within each feeder in the windfarm collector system, thus maximizing windfarm output. The invention is compatible with and an extension to windfarm voltage and power factor regulation. Losses are estimated to be reduced by 2-3% when the windfarm is operating around 50% VAR production/consumption.

This technique can optimize any windfarm collector system design. Mathematically an optimization problem is generally described by minimizing an objective function J(u,x) subject to some constraint conditions.

In matrix notation, this operation can be expressed as: Minimize J(u,x), subject to the constraints: d(u,x)=0 and e(u,x)≦0, where x represents system variables (e.g., bus voltages, power factor); u represents control variables (e.g., wind turbine generator reactive power); J(u.x) represents an objective function; d(u,x) represents equality constraints; and e(u,x) represents inequality constraints.

An example of an objective function was provided in Equation (3). This function may be employed in the present invention to minimize distribution line losses ($P_{LOSS}$) subject to maintaining power factor at the windfarm point of common coupling (POCC). It may also be desirable to establish a hierarchy of performance, enforcing a tighter voltage tolerance band at a subset of nodes. Applied to losses in a windfarm system the minimization function is specified in Equation 4:

$$\text{Minimize } J = \sum_{k=1}^{n} P_{Loss_k} \quad \text{Equation (4)}$$

where $$P_{LOSS}(S, V) = \left(\frac{V_{rated}}{V}\right)^2 \cdot \left(\frac{S}{S_{rated}}\right)^2 \cdot P_{LL-rated} + \left(\frac{V}{V_{rated}}\right)^N \cdot P_{NL-rated}$$

and subject to a system constraint that the system PF be 0.95 (over excited).

Figure 3:
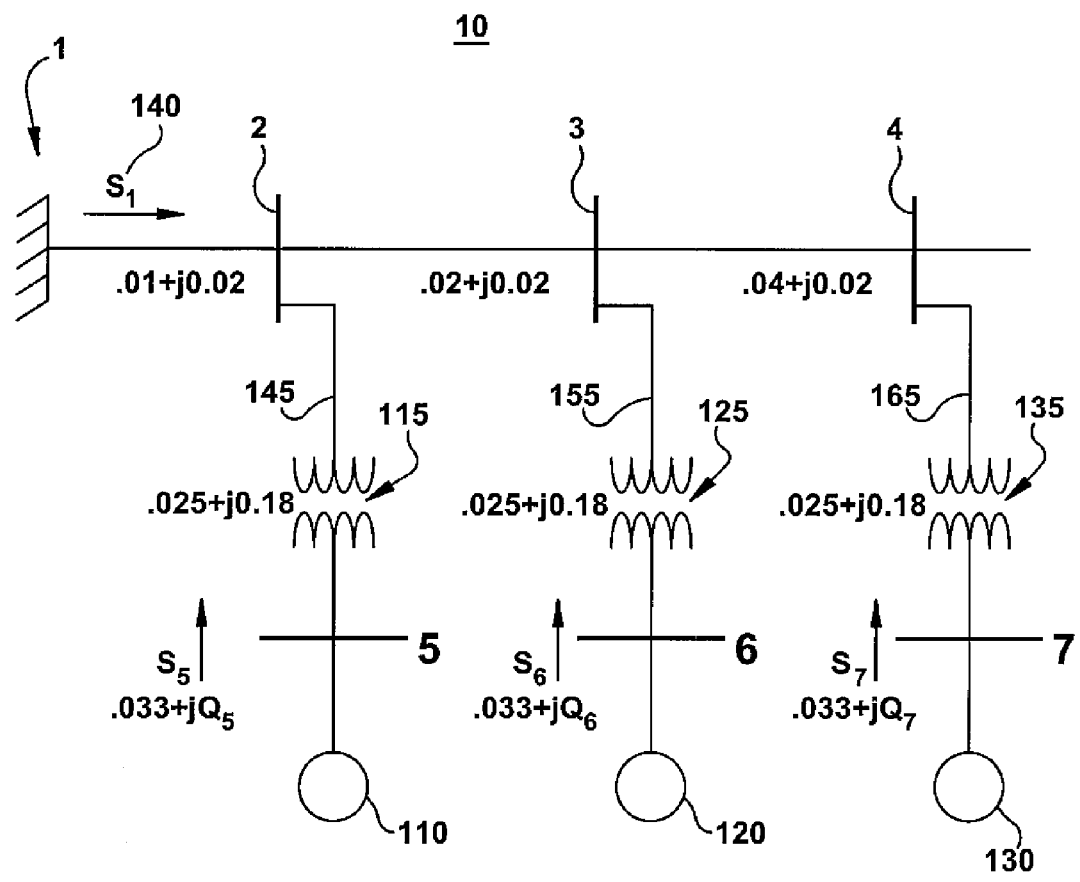
FIG. 3 illustrates a simple windfarm system of three wind turbine generators for the purpose of illustrating an optimizing reactive load distribution for minimizing losses according to the present invention.
Figure 4:
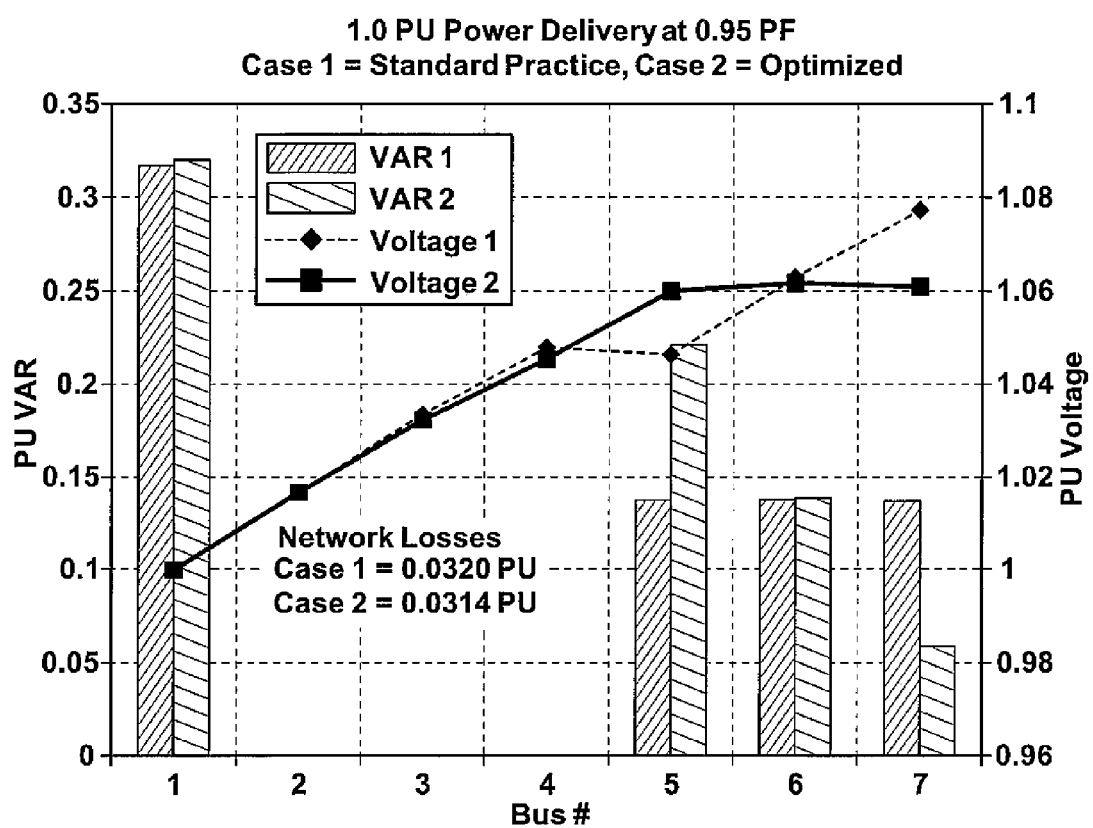
FIG. 4 illustrates a comparison of voltage and VAR distribution in a simple windfarm system with a standard VAR distribution versus an optimized VAR distribution among the wind turbines.

An optimization comparison according to the present invention for distribution of reactive load Q, so as to minimize losses, is shown in FIG. 4 for the simple windfarm system of FIG. 3. The example is illustrated using per unit values.

FIG. 3 illustrates a simplified wind farm collector system of three wind turbine generators for the purpose of illustrating a optimizing reactive load distribution according to the present invention. The simplified network 10 includes three wind turbine generators 110, 120 and 130 delivering loads $S_5=0.33+jQ_5$, $S_6=0.33+jQ_6$, $S_7=0.33+jQ_7$ of a total complex power demand at $S_1$ 140 of 1.0 PU at 0.95 power factor (PF) at the POCC 1. Each wind turbine generator feeds the main bus through identical transformers 115, 125 and 135 with impedances of 0.25+j0.18, resulting in transformer losses. Transformed outputs 145, 155, 165, from the wind turbine generators 110, 120 and 130 respectively, are connected to common system lines at buses 2, 3 and 4 and to a POCC connection bus 1 with the grid.

The simplified windfarm collector system 10 incurs no-load losses on transformers 115, 125 and 135 and line losses between bus 1 to 2, 2 to 3, and 3 to 4 dependent on the assignment of the total Q to $Q_5$, $Q_6$ and $Q_7$ among the wind turbine generators 110, 120 and 130.

When Equation 4 is applied to the network 10 of FIG. 3, subject to the constraint that of power delivery at 0.95 PF at the POCC 1, the results of FIG. 4 are generated.

FIG. 4 illustrates a comparison of VAR distribution and voltage distribution of the system of FIG. 3 with a standard VAR distribution and an optimized VAR distribution among the wind turbine generators. The left hand vertical axis is PU VAR values and the right hand vertical axis is PU voltage, provided for buses 1 though 5 as designated on the horizontal axis. Case 1 represents the standard prior art method of drawing reactive power equally among the wind turbine generators at buses 5, 6 and 7. Case 2 represents optimized values of reactive power at buses 5, 6 and 7 according to the algorithm for minimization of losses. Based on the above determination, the inventive system commands wind turbine generators 110, 120 and 130 to produce approximately 0.28 PU VAR. 0.13 PU VAR and 0.06 PU VAR. Loss minimized outputs of the individual wind turbine generators at other PU of power delivery and power factor are similarly determined.

In practice, a windfarm consists of numerous (sometimes more than 100) individual wind turbine generators. While the complexity for such systems are greater than the simple example, the minimizing process for such application can be similarly performed. Dynamic simulations and spreadsheet analysis of the voltage regulation have demonstrated the concept.

Figure 5:
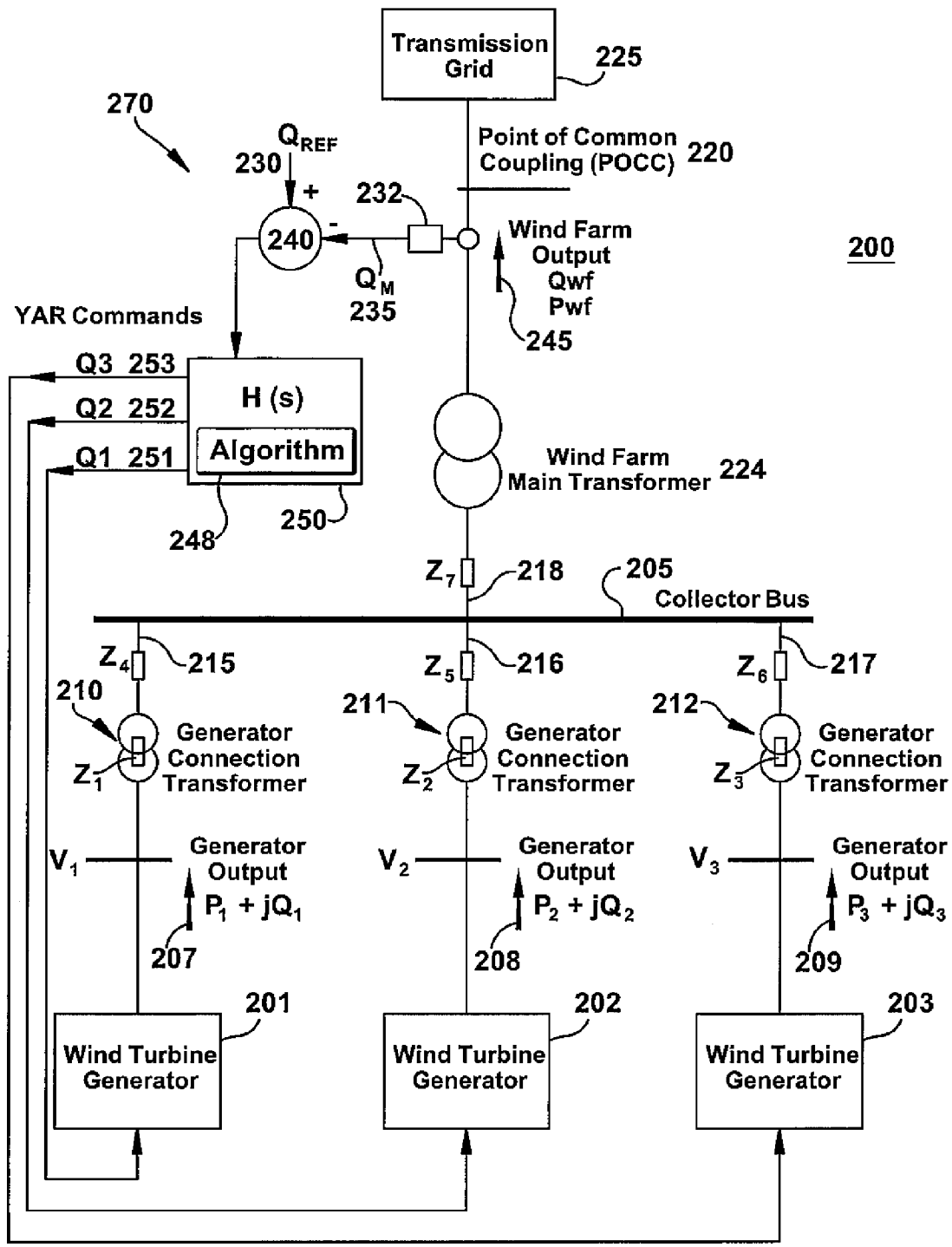
FIG. 5 illustrates an exemplary windfarm collector system employing a loss minimization algorithm.

FIG. 5 illustrates an exemplary windfarm collector system employing a loss minimization algorithm. The windfarm collector system 200 shows three wind turbine generators 201, 202, and 203, however, the number of wind turbine generators may be broadly extended in practical application. The wind turbine generators 201, 202 and 203 provide outputs $P_1+jQ_1$ (207), $P_2+jQ_2$ (208) and $P_3+jQ_3$ (209). Each wind turbine generator 201, 202 and 203 is tied to a collector bus 205 through a wind turbine generator connection transformer 210, 211 and 212, respectively, where the transformer presents an impedance Z1, Z2 and Z3 to the collector system. The wind turbine generator collection transformers 210, 211 and 212 may be located at varying physical distances 215, 216 and 217 from the collection bus 205 presenting different line resistance and reactance to the system (Z4, Z5 and Z6). A common path for one or more wind turbine generator loads may also be presented to the collector system such as 218 (Z7) between the collection bus 205 and wind farm main transformer 224. While the impedances are shown for illustrative purposes as discrete elements, it is recognized that they may represent distributed line elements, representing varying distances of line.

Further in such a system, although not illustrated in FIG. 5, multiple wind turbine generators may be combined at different lengths along different legs and then connected to the collector bus 205. Other configurations may include a dendritic topology with one or more branchings or looped networks. While such arrangements are more complex, circuit modeling for such systems may be performed.

Again referring to FIG. 5, the collector bus 205 is tied through a point of common connection to a transmission grid 225 through wind farm main transformer 224. Sensing devices 232 at the POCC 220 may provide measured voltage, current, power factor, real power and reactive power signals to a windfarm control system. While not shown, sensing devices may be alternatively located at other locations other than the POCC 220 to provide voltage and other measurements, which may be referred to the POCC 220 as is known in the art. In a further embodiment, signals at the point of common connection may be calculated based on windfarm system measurements and a knowledge of the network impedance. Further, a control system 270 is provided for the windfarm. A reference command is provided to the windfarm control system 270 for control of real and reactive power. However, only the reactive load reference command signal $Q_{REF}$ 230 and reactive measured load signal $Q_M$ (measured) 235 are provided to summer 240. The output from summer 240 is provided to control function H(s) 250 for determining reactive load distribution to the individual wind turbine generators. Control function H(s) 250 incorporates a loss minimization algorithm 248 whose technical effect is to minimize windfarm collector system loss by assignment of reactive loads Q1 251, Q2 252 and Q3 253 based on losses resulting from Z1, Z2 and Z3 wind turbine generator connection transformer losses, from Z4, Z5 and Z6 line losses and Z7 line losses. Further, the windfarm control algorithm may be subject to various constraints, one of which may be a power factor of approximately 0.95 at the POCC.

In a windfarm where on-load tap changing capability exists on the main transformer to the grid, voltage control may similarly be exercised to minimize losses. In this case, the standard method for an equal distribution of VARS to all wind turbine generators may be employed, but the voltage at the windfarm collector may be controlled to minimize losses. This approach may be employed provided the on-load tap changing capability permits the desired collector voltage to be matched to the required grid voltage of the POCC.

The minimization algorithm of the present invention may be determined based on reactive load commands $Q_1$ 251, $Q_2$ 252 and $Q_3$ 253 being equally ordered to each wind turbine generator (201, 202, 203). Alternatively, the loss-minimizing algorithm may combine the VAR distribution technique and the voltage optimization technique.

Figure 6:
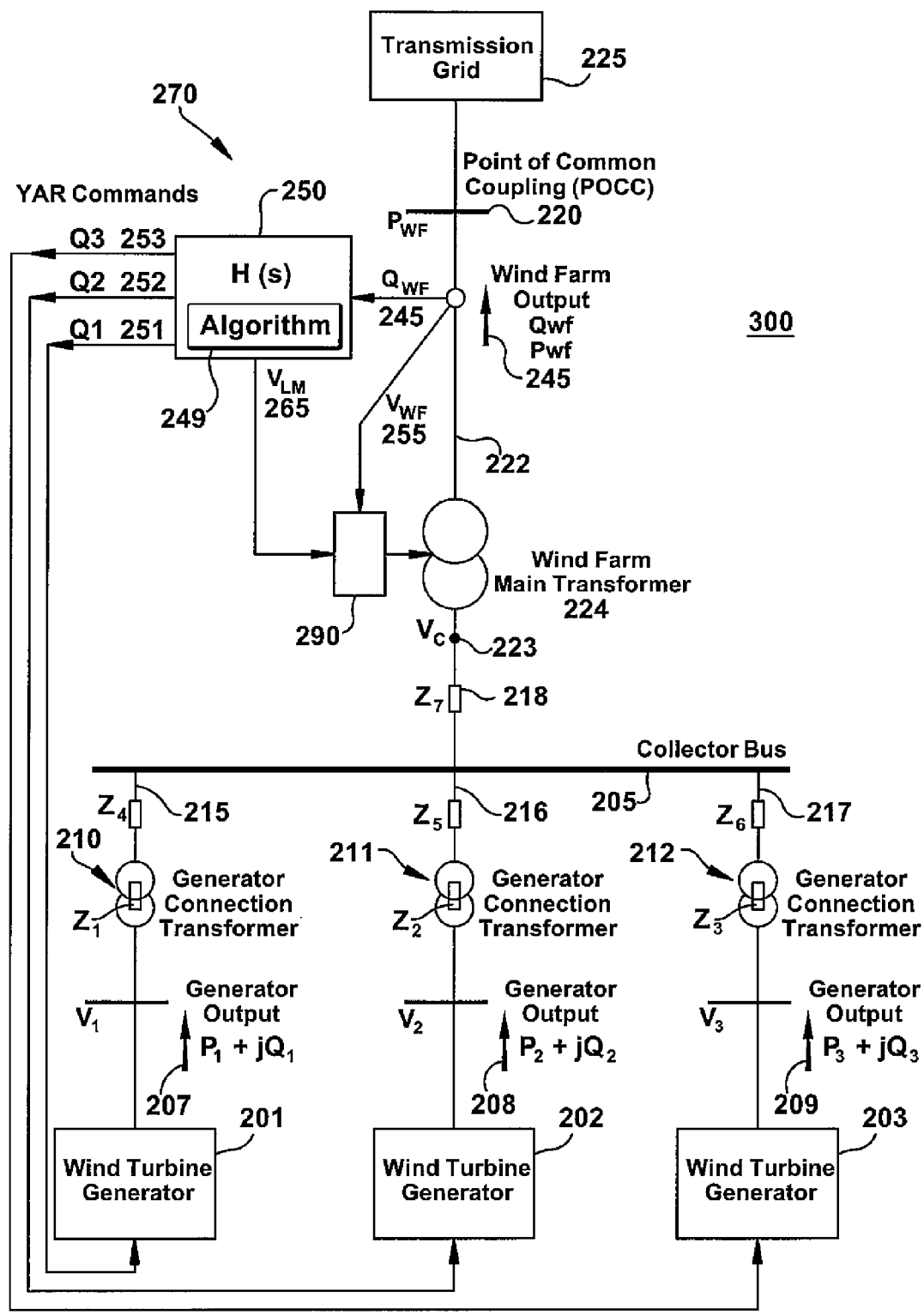
FIG. 6 illustrates an exemplary windfarm collector system with on-load tap changing control employing a loss minimization algorithm.

FIG. 6 illustrates an exemplary windfarm collector system with on-load tap changing control employing a loss minimization algorithm. The windfarm collector system with on-load tap changing capability 290 is configured in a similar manner to that of FIG. 5. Reference numbers from FIG. 5 have been retained where the components and functions are unchanged. Three wind turbine generators 201, 202 and 203 provide outputs $P_1+jQ_1$ (207), $P_2+jQ_2$ (208) and $P_3+jQ_3$ (209) to a system whose losses may be modeled as including: no-load transformer losses in wind turbine generator connection transformers 210., 212 and 213; transformer load losses from $Z_1$, $Z_2$, and $Z_3$; line losses from $Z_4$, $Z_5$ and $Z_6$ and common fine losses from $Z_7$. While the impedances are shown for illustrative purposes as discrete elements, it is recognized that they may represent distributed line elements, representing varying distances of line.

FIG. 6 further illustrates a windfarm control system 270 including a control function H(s) 250 that determines an optimized system voltage setting based on minimizing system losses. According to a loss minimizing algorithm 249, a voltage $V_c$ 223 on the collector bus side of the wind farm main transformer 224 is determined that minimizes system losses described above, subject to the constraints of windfarm output 245 of real and reactive power ($P_{WF}$ and $Q_{WF}$, respectively) at the POCC 220. The loss minimizing voltage at 223 corresponds to a measured voltage $V_{WF}$ 255 at the main transformer output 222 reflected through the transformer 224 characteristics. H(s) 250 provides the loss minimizing voltage signal $V_{LM}$ 265. $V_{LM}$ 265 and $V_{WF}$ feedback signal 255 are provided to the on-load tap changer control 290. On-load tap changer 290 adjusts voltage tap settings on the windfarm main transformer to establish the loss optimizing voltage at the input 223 to the wind farm main transformer 224. The loss minimizing algorithm 249 will be subject to the constraint that the voltage (V1, V2, V3) at the output of each wind turbine generator must be within the operating limits for that device; e.g., 0.9 to 1.1 times rated voltage.

Figure 7:
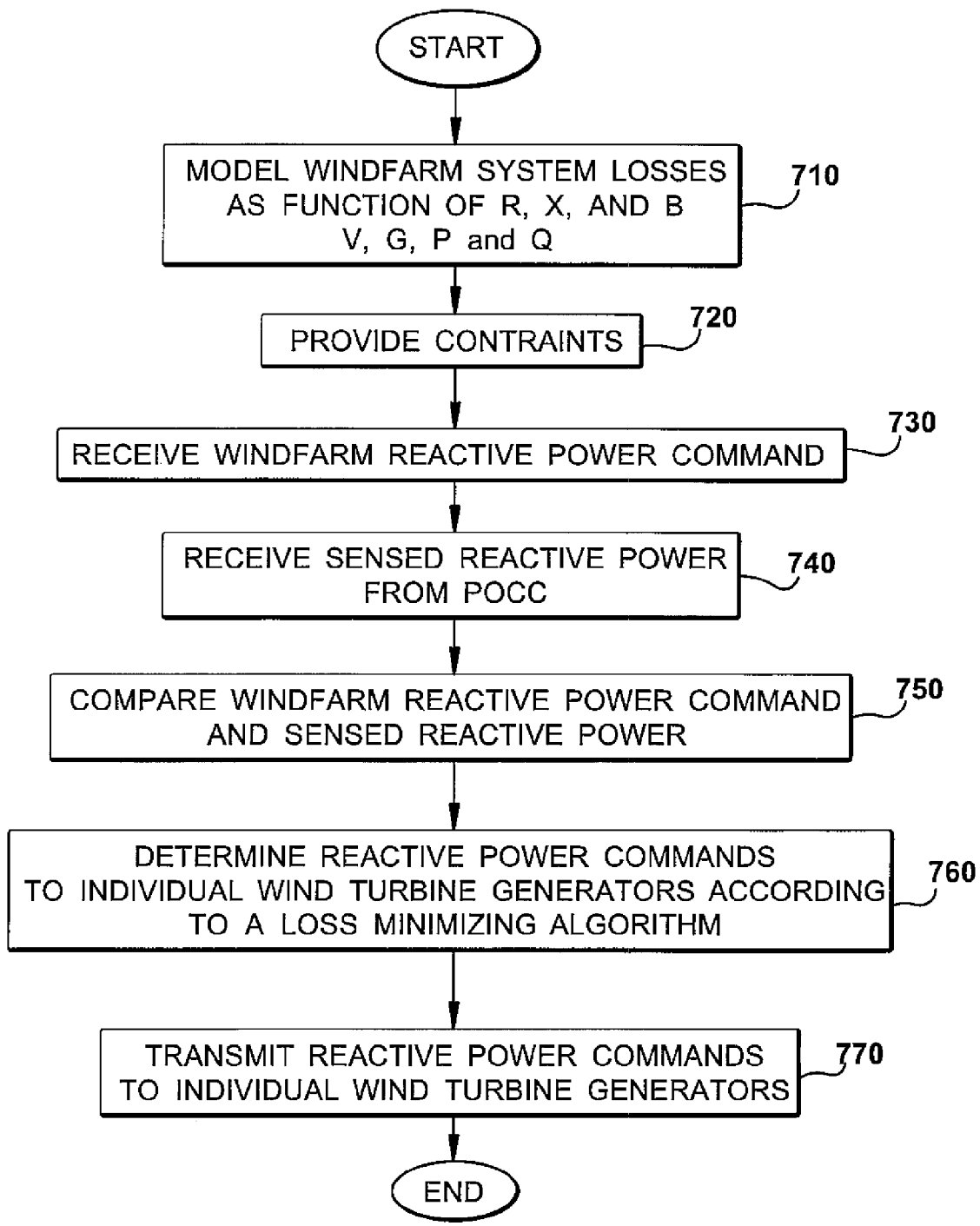
FIG. 7 illustrates a flowchart for a method for minimizing collector system loss through an algorithm for assignment of reactive load to individual wind turbine generators.

FIG. 7 illustrates a flowchart for a method for minimizing collector system loss through an algorithm that assigns reactive load to individual wind turbine generators. Initially, in step 710, the windfarm collector system losses are modeled as a function of resistance R, reactance X, nonlinear conductance G, susceptance B, voltage, and real and reactive load. In step 720, system constraints are provided, including factors such as power flow, power factor and voltage requirements. In step 730 a windfarm reactive power or voltage command is received by the controls. In step 740, the sensed reactive power at the POCC is received by the system controls. The windfarm reactive power command and the sensed reactive power are compared in step 750. In step 750 the reactor power commands are assigned to the individual wind turbine generators according to the loss-minimizing algorithm. In step 760, the individual reactive power commands are transmitted to the individual wind turbine generators.

Figure 8:
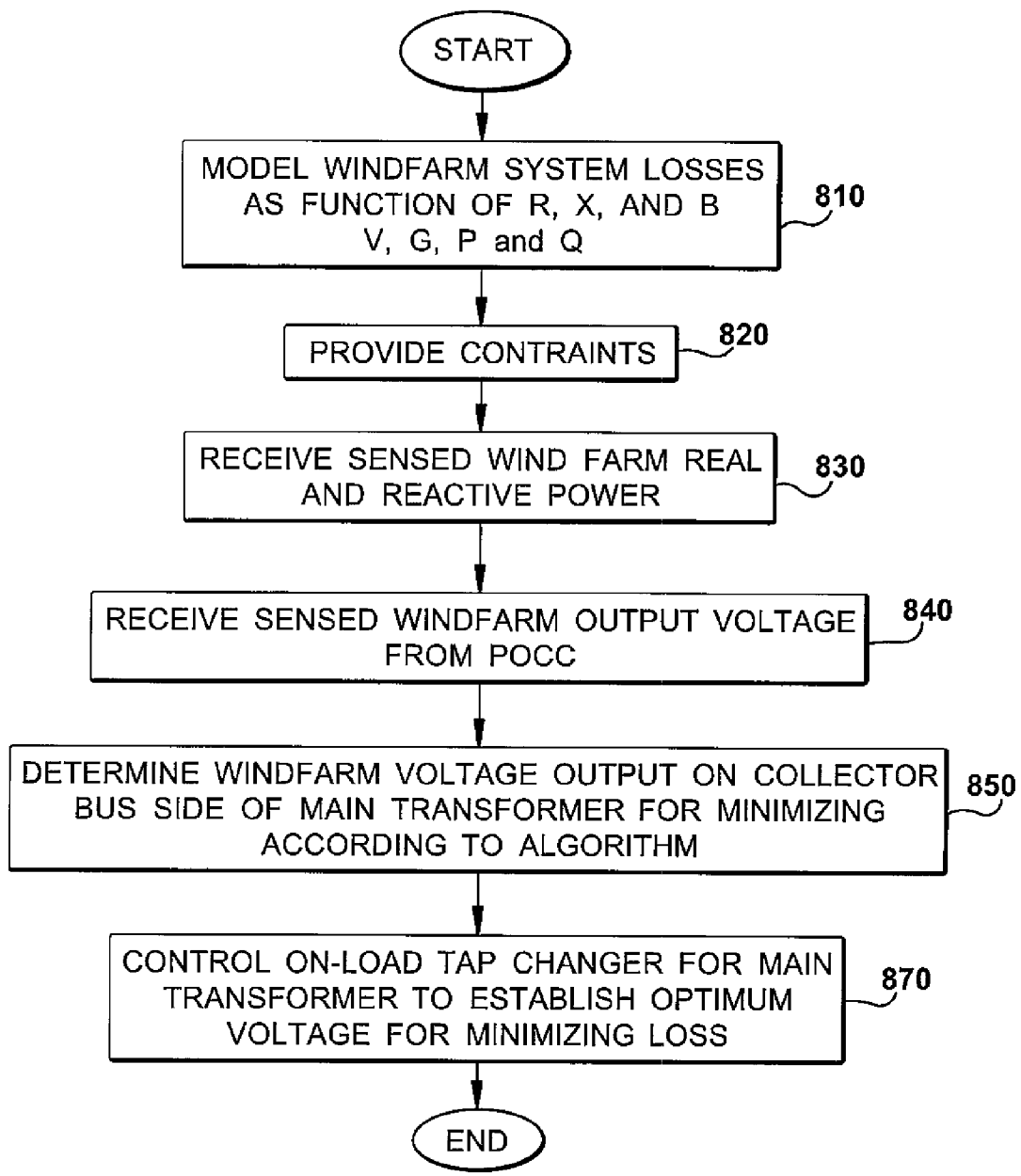
FIG. 8 illustrates a flowchart for a method for minimizing collector system loss through an algorithm for establishing an optimized voltage on the collector system side of the wind farm main transformer.

FIG. 8 illustrates a flowchart for a method for minimizing collector system loss through an algorithm for establishing an optimized voltage on the collector system side of the wind farm main transformer. Initially, in step 810, the windfarm collector system losses are modeled as a function of resistance R, reactance X, nonlinear conductance G, susceptance B, voltage, and real and reactive load. In step 820, system constraints are provided, including factors such as voltage range at the output of the wind turbine generators. In step 830, a windfarm real and reactive power output at the POCC is received by the system controller. In step 840, the sensed voltage output at the POCC is received by the system controller. In step 850, the optimum voltage on the collector bus side of the main transformer is determined according to the loss-minimizing algorithm, subject to system constraints. In step 870, the on-load tap changer on the main transformer is controlled to establish the optimum voltage for loss minimization.

Previous windfarms have been equipped with windfarm controllers that regulate POCC voltage and power factor quantities, but none built to date have incorporated methods to regulate these system quantities and optimize the losses simultaneously.

One aspect of the present invention (applicable to windfarm collector systems with on-load tap changers for the main windfarm transformer) incorporates an algorithm, which determines an optimum voltage for minimizing loss and then controls the tap changer to establish the optimum voltage. A second aspect of the present invention incorporates an algorithm, which considers the collector system impedance and selectively operates each turbine at a different VAR output while still maintaining the required output as measured at the POCC. Both approaches provide for reduction in system losses without the need for additional system hardware.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A windfarm system optimized for minimizing electrical loss, the system comprising:
   a plurality of wind turbine generators;
   a collector system including at least one of a conductor and network of conductors, wherein the wind turbine generators are connected to the at least one of a conductor or network of conductors;
   a plurality of transformers, including at least one transformer connected between each wind turbine generator and the conductor;
   a substation transformer connecting the windfarm collector system to an electrical grid;
   a monitoring system including at least one of monitoring the windfarm electrical output and thermal condition, and outputs of the individual wind turbine generators;
   a control system including voltage and real and reactive power commands to the individual wind turbine generators; and
   an algorithm whose technical effect is minimizing electrical losses for the windfarm collector system as a whole from transformer losses and line losses by assigning electrical load to individual wind turbine generator of the windfarm collector system.

2. The windfarm system optimized for minimizing electrical loss according to claim 1, wherein the algorithm further comprises: a model of windfarm collector system losses.

3. The windfarm system optimized for minimizing electrical loss according to claim 2, wherein the model of windfarm collector system losses comprises least one of resistance effects, reactance effects, nonlinear conductance, voltage, real load, and reactive load for system line and transformers.

4. The windfarm system optimized for minimizing electrical loss according to claim 3, wherein the model of windfarm collector losses comprises system constraints of at least one of power flow limits, power factor and voltage.

5. The windfarm system optimized for minimizing electrical loss according to claim 4, the algorithm comprising a determination of optimized VAR load distribution to the individual wind turbine generators minimizing electrical line loss for the windfarm collector system as whole,
   a no-load (excitation) loss.

6. The windfarm system optimized for minimizing electrical loss according to claim 5, the algorithm comprising:
   a determination of optimized VAR load distribution to the individual wind turbine generators by shifting VAR load to the wind turbine generators closest to the point of common coupling.

7. The windfarm system optimized for minimizing electrical loss according to claim 2, the algorithm further comprising:

a determination of optimized VAR load distribution to the individual wind turbine generators to minimize transformer loss.

8. The windfarm system optimized for minimizing electrical loss according to claim 7, wherein the windfarm system comprises a substation with tap changing capability and the algorithm comprises
a determination of optimized voltage at the collector system side of the tap changing transformer for electrical loss minimization of the windfarm collector system as a whole.

9. The windfarm system optimized for minimizing electrical loss according to claim 8, the algorithm further setting transformer taps for electrical loss minimization of the windfarm collector system as a whole, subject to constraint of maintaining system parameters within allowable limits.

10. The windfarm system optimized for minimizing electrical loss according to claim 9; wherein the electrical losses for the windfarm as a whole being minimized by transformer tap changing are subject to constraints comprising:
maintaining at least one of a power factor, power flow limits, and voltage at the point of common coupling and within the voltage range of the wind turbine generator.

11. The windfarm system optimized for minimizing electrical loss according to claim 10, the control system further comprising: control over the tap changer to execute the optimized voltage at the input side of the tap changing transformer.

12. A method for controlling windfarm operation to minimize electrical losses, the method comprising:
connecting a plurality of wind turbine generators to at least one of a conductor and network of conductors within a windfarm collector system;
connecting the network of conductors to the electrical grid through a substation transformer;
monitoring the electrical output of the windfarm system and the output of the individual wind turbine generators; and
minimizing electrical losses for the windfarm collector system as a whole from transformer losses and line losses according to an algorithm by assigning electrical load to individual wind turbine generators of the windfarm collector system.

13. The method for controlling windfarm operation to minimize electrical losses according to claim 12, the step of minimizing electrical losses comprising:
modelling windfarm collector system losses with the algorithm.

14. The method for controlling windfarm operation to minimize electrical losses according to claim 13, the step of modelling comprising: including at least one of resistance effects, reactance effects, nonlinear conductance, voltage, real load, and reactive load within the model of windfarm collector system losses.

15. The method for controlling windfarm operation to minimize electrical losses according to claim 14, the step of modeling electrical losses for the windfarm as a whole further comprising:
establishing constraints on windfarm collector system parameters for operations within safe limits.

16. The method for controlling windfarm operation to minimize electrical losses according to claim 15, the step of establishing constraint on windfarm collection system parameters comprising observing power flow limit, power factor limits and voltage limits at a point of common coupling.

17. The method for controlling windfarm operation to minimize electrical losses according to claim 12, the step of minimizing electrical losses for the windfarm collector system as a whole comprising:
determining optimized VAR load distribution to the individual wind turbine generators minimizing electrical line loss for the windfarm collector system as a whole.

18. The method for controlling windfarm operation to minimize electrical losses according to claim 17, further comprising:
determining optimized VAR load distribution to the individual wind turbine generators closet to the point of common coupling.

19. The method for controlling windfarm operation to minimize electrical losses according to claim 17; further comprising: determining optimizied VAR load distribution to the individual wind turbine generators to minimize transformer loss for the windfarm as a whole; and
determining optimized voltage at the collector system side of the tap changing transformer for electrical loss minimization.

20. The method for controlling windfarm operation to minimize electrical losses according to claim 19, the step of determining optimized voltage at the input side of the tap changing transformer for electrical loss minimization further comprising:
determining a conduction loss and a no-load (excitation) loss.

21. The method for controlling windfarm operation to minimize electrical losses according to claim 19, the step of determining optimized voltage at the input side of the tap changing transformer for electrical loss minimization comprising:
maintaining at least one of a power factor, power flow and voltage at the point of common coupling and within the voltage range of the wind turbine generators.

22. The method for controlling windfarm operation to minimize electrical losses according to claim 21, further comprising:
controlling the tap changer to execute the optimized voltage at the input side of the tap changing transformer.

* * * * *